Figure 1:
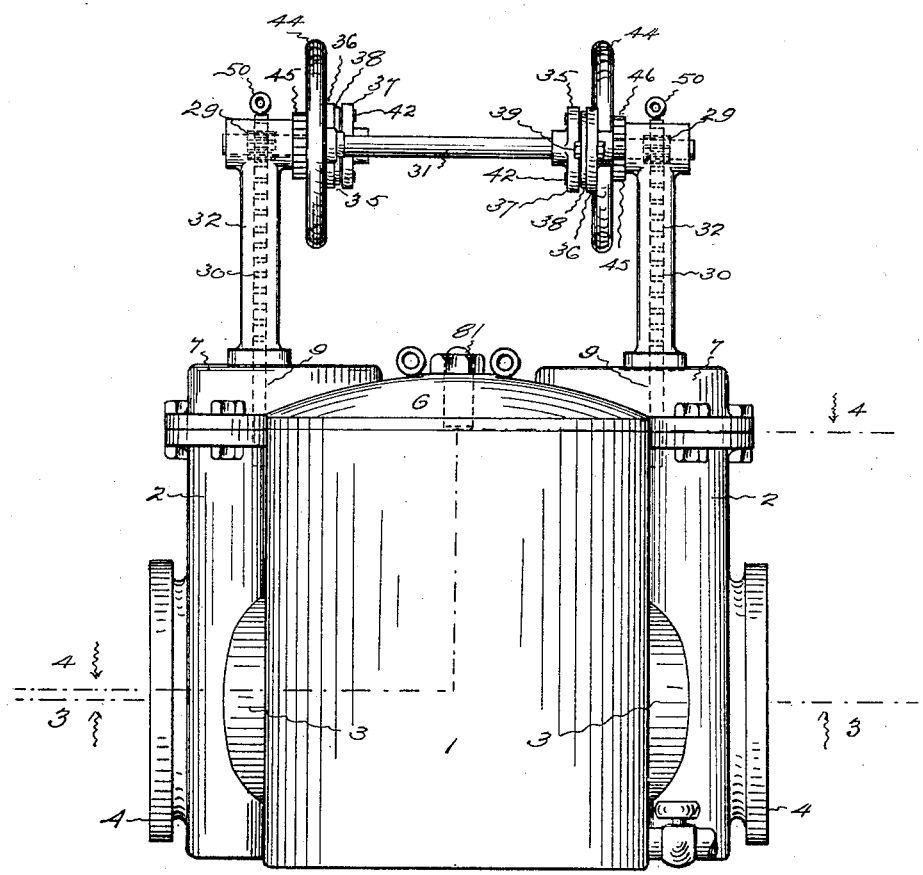

P. J. DARLINGTON.
VALVE MECHANISM FOR LIQUID STRAINING OR FILTERING APPARATUS.
APPLICATION FILED MAR. 10, 1920.

1,389,939.

Patented Sept. 6, 1921.

6 SHEETS—SHEET 1.

INVENTOR
Philip J. Darlington
BY Harry P. Williams
ATTORNEY

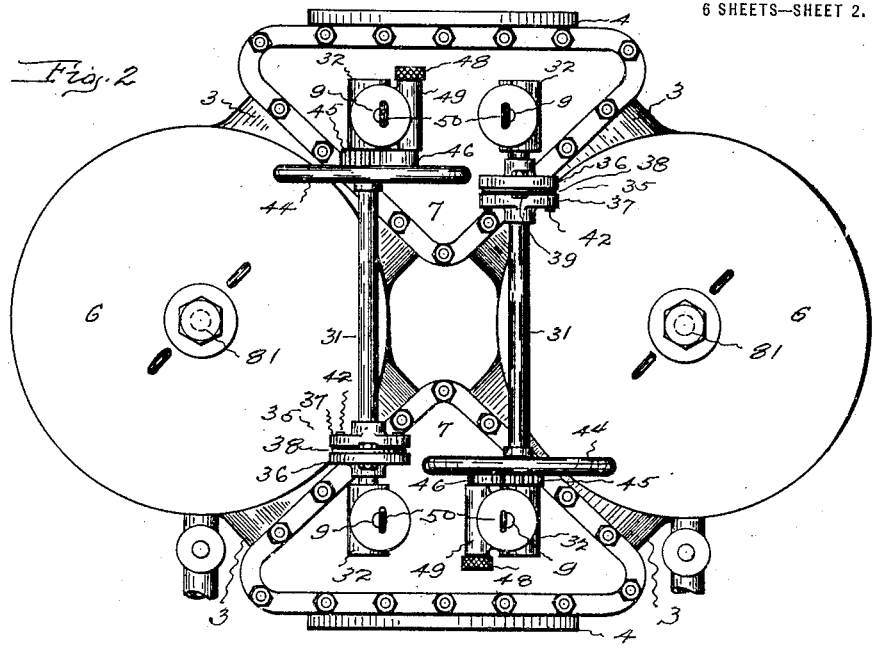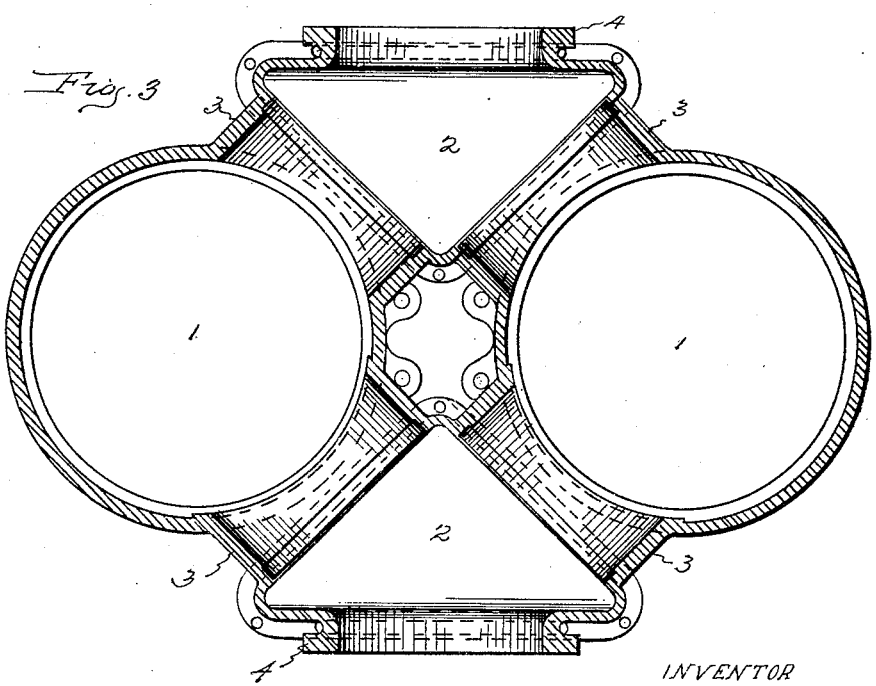

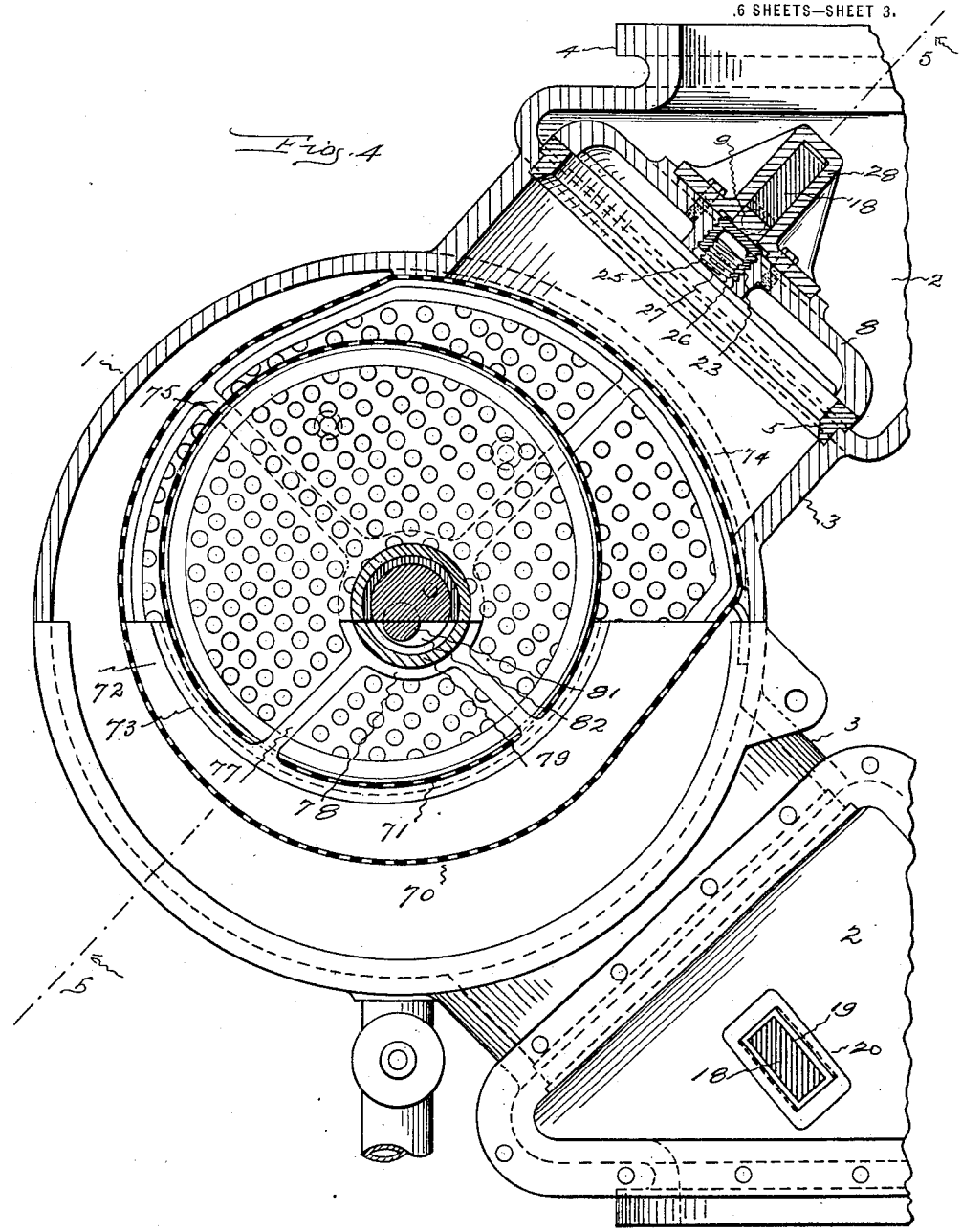

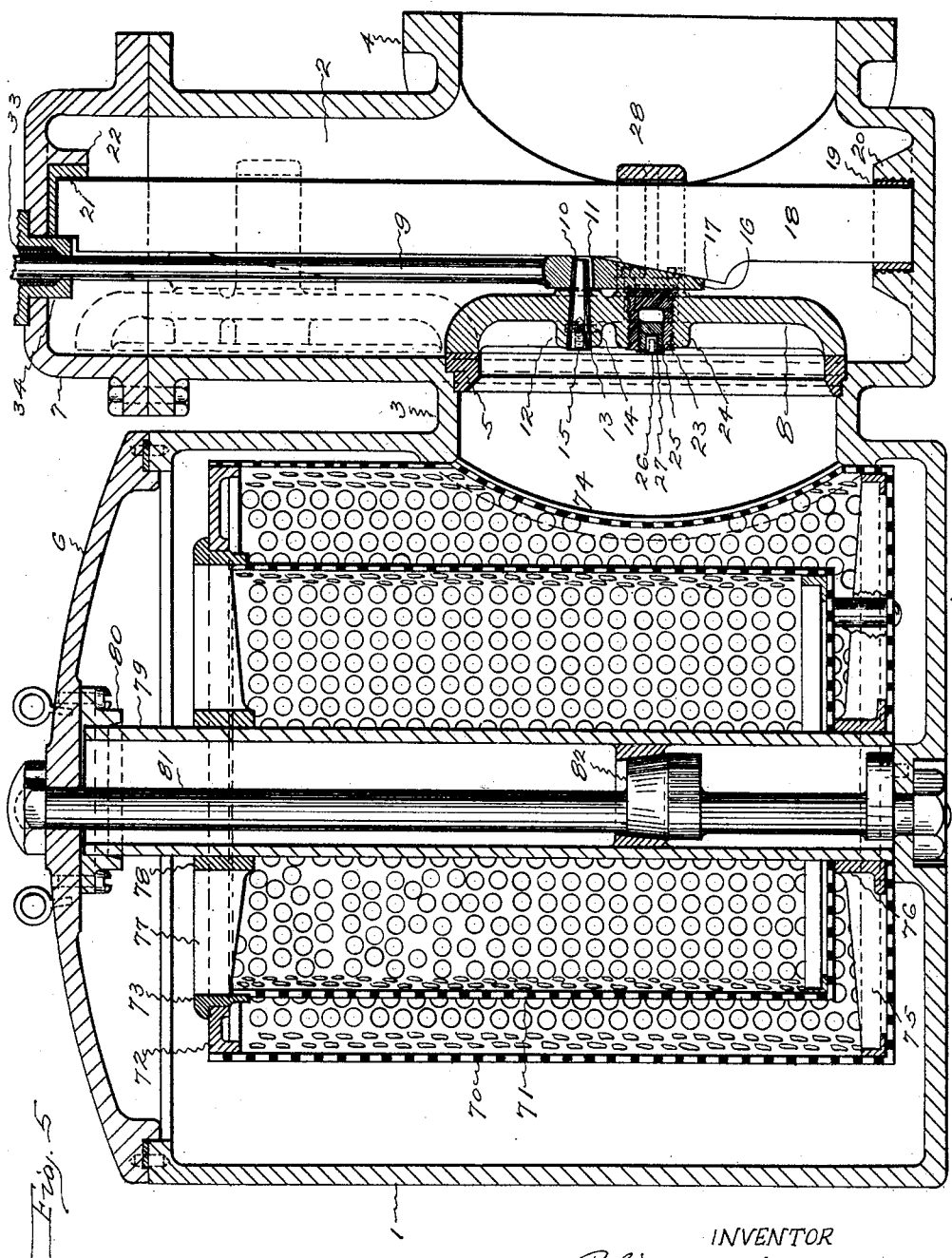

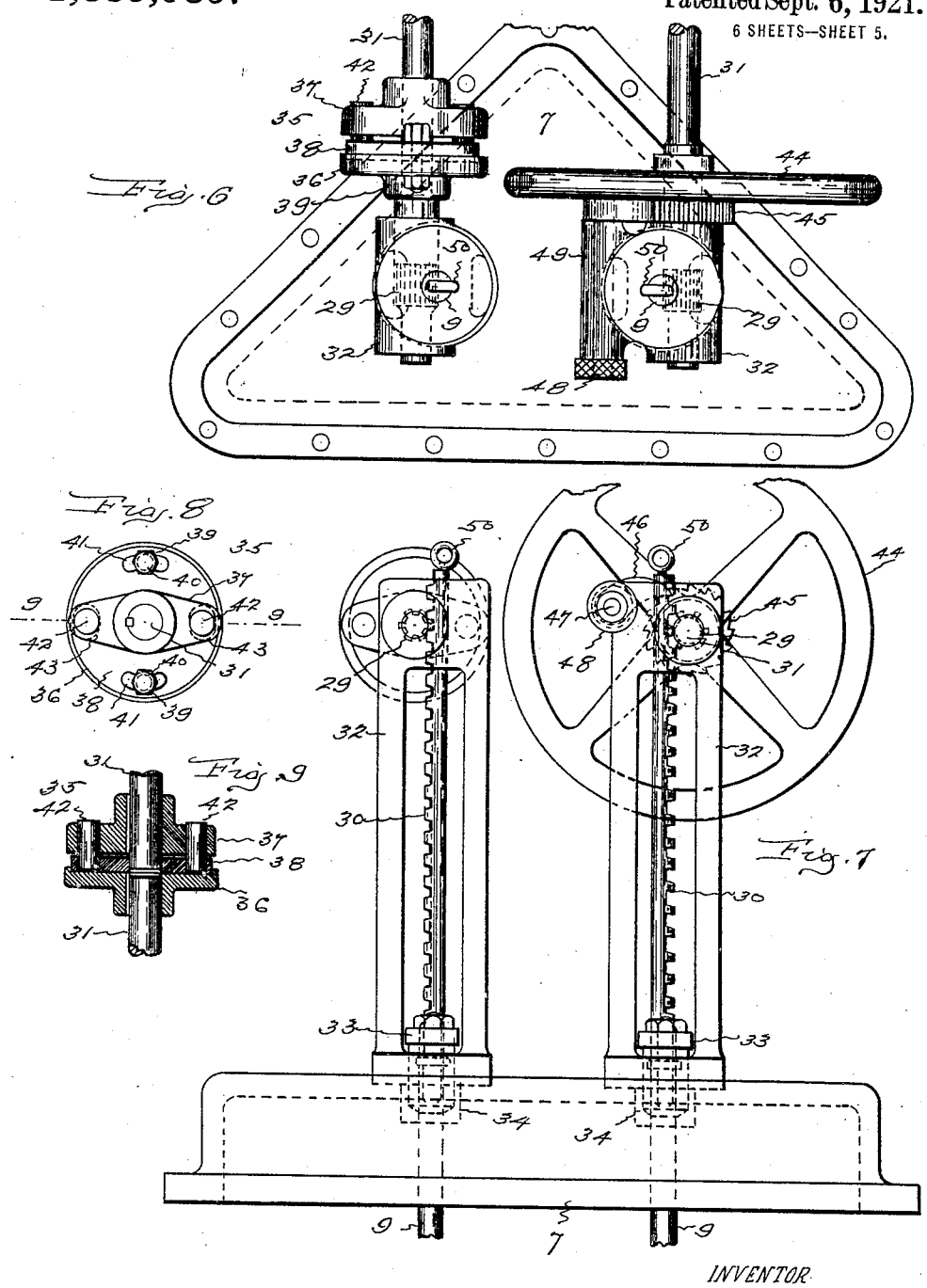

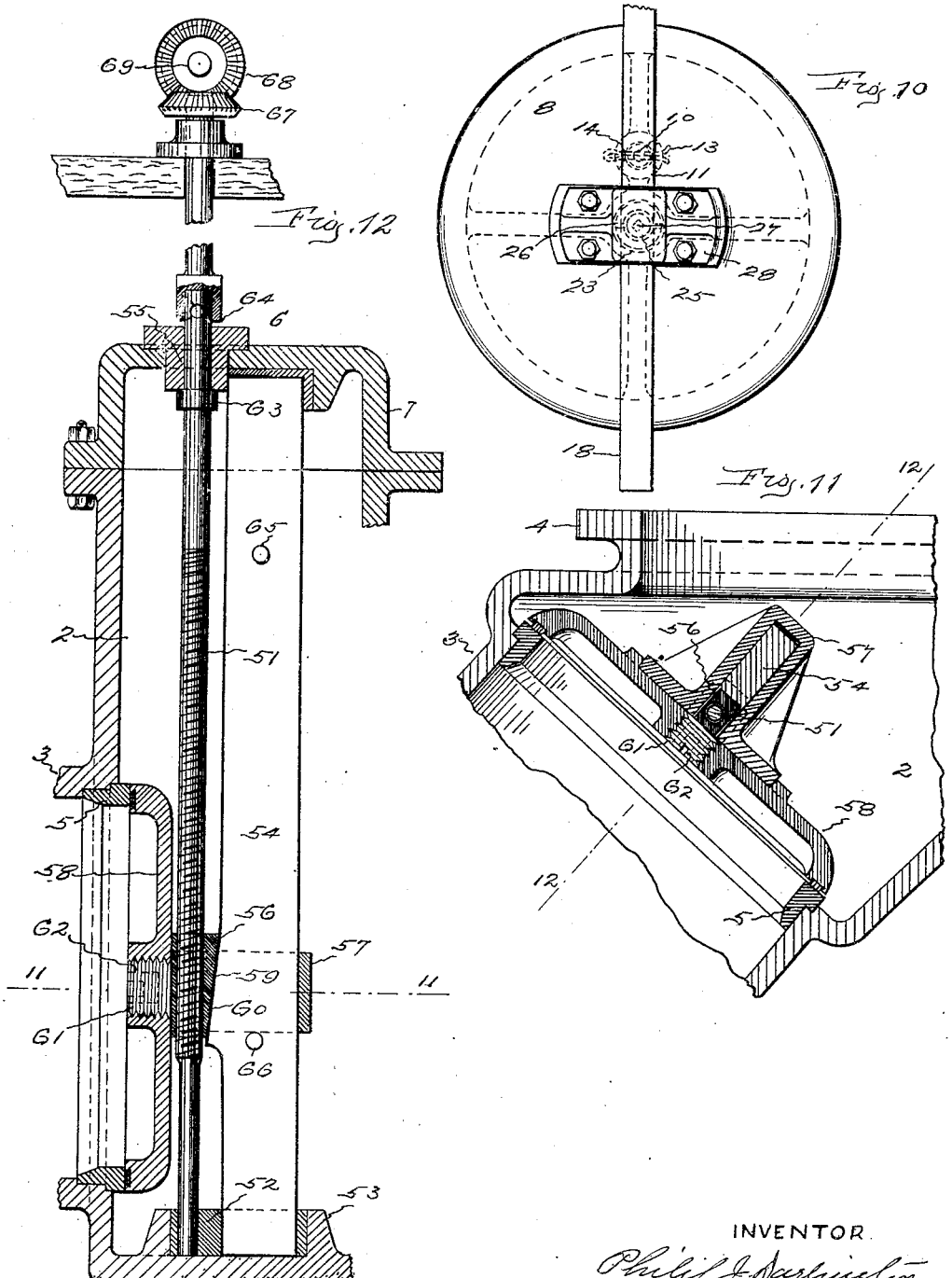

UNITED STATES PATENT OFFICE.

PHILIP J. DARLINGTON, OF GREENFIELD, MASSACHUSETTS.

VALVE MECHANISM FOR LIQUID STRAINING OR FILTERING APPARATUS.

1,389,939.   Specification of Letters Patent.   Patented Sept. 6, 1921.

Original application filed March 26, 1919, Serial No. 285,155. Divided and this application filed March 10, 1920. Serial No. 364,646.

*To all whom it may concern:*

Be it known that I, PHILIP J. DARLINGTON, a citizen of the United States, residing at Greenfield, in the county of Franklin and State of Massachusetts, have invented a new and useful Improvement in Valve Mechanism for Liquid Straining or Filtering Apparatus, of which the following is a specification.

This invention, which is divided from the invention that forms the subject of my copending application No. 285,155, filed March 26, 1919, relates to the valve mechanism provided for apparatus which is designed for separating by straining or filtering undesirable matter from liquids, for instance, cinders, twigs, leaves and the like solid matter from natural sources of water supply, solid foreign matter from fuel and lubricating oils and similar fluids and oil and other oleaginous impurities from water, which apparatus is constructed so that it may be in constant use, that is, may be cleaned and repaired when necessary or desirable without interfering with its use or obstructing its normal operation.

The object of the invention is to provide a valve mechanism for apparatus of this class which can be built cheaply with an ordinary manufacturing equipment, that is simple, strong, durable and reliable and can be quickly and safely operated, adjusted, cleaned and repaired by unskilled workmen, and that is capable of being used under wide range of conditions as to location, pressure or suction, nature of liquid to be treated and impurities or foreign matter to be removed.

In the accompanying drawings a twin strainer, that is, one in which there are two sets of valves and strainer baskets, is illustrated and Figure 1 shows a side elevation of such an apparatus which is provided with the features of this invention. Fig. 2 shows a plan of the same. Fig. 3 is a horizontal section of the casing on the plane indicated by the dotted line 3—3 on Fig. 1 looking upward. Fig. 4, on larger scale, shows a horizontal section of a part of the apparatus on the planes indicated by the dotted line 4—4 on Fig. 1 looking downward. Fig. 5 is a vertical section taken on the plane indicated by the line 5—5 on Fig. 4. Fig. 6 shows a plan of one valve box and valve operating mechanism. Fig. 7 shows a front elevation of the parts shown in Fig. 6. Fig. 8 shows a front elevation of a coupling used in the valve operating mechanism. Fig. 9 shows a section of the coupling on the plane indicated by the dotted line 9—9 on Fig. 8. Fig. 10 shows an elevation of one of the valves and its guide bar. Fig. 11 shows a horizontal section of the valve with a modified form of operating mechanism on the plane indicated by the line 11—11 on Fig. 12. Fig. 12 shows a vertical section of the modified form of valve operating mechanism taken on the plane indicated by the line 12—12 on Fig. 11.

The casing of the apparatus comprises a pair of vertically arranged cylinders 1 that contain the filter chambers and on each side intermediate the cylinders vertically arranged triangular valve boxes 2 that contain the intake and discharge valve chambers. The cylinders and valve boxes are connected by hubs 3 which contain the valve ports. The outer faces of the valve boxes are provided with flanges 4 for attachment with the intake and discharge pipes of the system with which the apparatus is used. The full triangular cross section of the valve chambers extends to the top of the casing and the vertical walls of the valve chambers at the ends of the hubs are at right angles to the axes of the passages through the hubs. In the outer ends of the hubs are valve seat bushings 5, the inside diameters of which are at least equal to the diameters of the intake and discharge openings through the flanges. The tops of the cylinders are closed by circular covers 6 and the tops of the valve boxes are closed by triangular covers 7 bolted thereto. This construction permits the seat bushings to be inserted through the open tops of the valve chambers when the covers are removed and allows the introduction of tools for boring, reaming, facing and adjusting the valve seat parts, while the planes of the seat bushing bores and intake and discharge openings are so related that a boring bar of large diameter may be introduced into the valve chambers through the intake and discharge openings.

There are four valve disks 8, two in the intake valve chamber and two in the discharge valve chamber, adapted to open and close the ports through the valve seat bushings that are set in the hubs which connect the two valve boxes with the two cylinders.

The valve disks are let down into the chambers from the top when the covers are removed. Each valve disk is loosely connected to a vertically arranged valve stem 9, preferably by means of a pin 10 that passes through the valve disk and into a vertically elongated hole 11 in the stem. This pin is inserted into position from the front face of the valve disk through a reinforcing boss 12 and is normally held in place by a cotter pin 13 that passes transversely through the connecting pin and boss and has its spread ends lying in recesses 14 in opposite sides of the boss. In the larger end of the connecting pin is a threaded hole 15 adapted to receive means for withdrawing the pin from place.

When a descending valve disk reaches its lowest position it is forced against its seat bushing by means of the engagement of the inclined surface 16 on the back of the lower end of the stem with the inclined surface 17 on the front of a guide bar 18. This guide bar is removably held in place at its lower end by a set lining 19 formed in a lower bar socket 20 on the bottom of the casing and at its upper end by a set lining 21 formed in an upper bar socket 22 on the under face of the valve box cover. These set linings are preferably made by pouring Babbitt or other easily fusible metal into the sockets after the guide bars have been placed in position and held by clamping them to their respective valve disks with the valve disks located in closed positions against the seat bushings. It is desirable to have the inner walls of the lower sockets for these set linings roughened so the lining material that is poured into the sockets will be firmly held in place.

For the purpose of adjusting the pressure of the valve disks against the seat bushings after wear or re-seating, thrust screws 23 are turned through the central bosses 24 against the front faces of the valve stems. After a valve disk has been properly adjusted by means of its thrust screw a tapered expansion plug 25 is screwed tightly into a tapered threaded hole in the end of the thrust screw to expand and tightly lock the thrust screw against accidental loosening. The front end of the thrust screw is desirably provided with two cross slots 26 adapted to receive a screw driver for turning the thrust screw, and the expansion plug is desirably provided with a square socket 27 for receiving a key by which it may be turned. For these operations the parts are accessible through the strainer chambers and branch passages when the valve disks are in closed position.

On the back of each valve disk is a supporting saddle 28 by means of which it is held to but is free to slide on its guide bar. This saddle is preferably made in one piece that passes around the bar and is secured to the back of the valve disk by screws or other suitable fastening means. A small clearance space is left between the saddle and the guide bar to admit of the necessary adjustment of the valve after wear or re-seating.

In one form of apparatus illustrated each valve is operated by a toothed pinion 29 that engages a toothed rack 30 at the upper end and preferably integral with the valve stem. This pinion has a shaft 31 which is journaled in the top of a stand 32 removably secured to the valve box cover, which stand desirably has a stuffing-box 33 in its base through which the valve stem passes. In this form the base of the stand projects through and below the cover of the valve box in the shape of a cylindrical extension 34 which engages the end of the guide bar and holds it back into its set lining. The pinion shafts operating the intake valve disks are joined to the pinion shafts operating the discharge valve disks by adjustable couplings 35 to insure simultaneous seating of the intake valve disk of one strainer cylinder and the discharge valve disk of the same strainer cylinder, which are connected. Each of these couplings comprises a circular flange member 36 keyed to one shaft, a two-arm member 37 keyed to the shaft in alinement therewith, and a drive disk 38 seated in a counterbore in the inner face of the flange member. The flange member and the drive disk are adjustably connected by bolts 39 that extend through circumferentially spaced perforations 40 in the flange member and slots 41 in the drive disk, and the two-arm member is connected with the drive disk by pins 42 that fit perforations in the two-arm member and extend into elongated slots 43 in the drive member. By this means two valve disks, an intake valve and a discharge valve, are controlled by the same coupled pair of shafts and may be seated simultaneously but unseated one ahead of the other. Keyed to one of the pinion shafts of each coupled pair is a hand wheel 44, attached to which is a ratchet wheel 45. This ratchet wheel is engaged by a pawl 46 on an arbor 47 that has a knurled handle 48 and is supported by a bracket 49 on the stand. The valve disks are raised for opening by turning the hand wheel in one direction and closed by turning the hand wheel in the opposite direction. The pawl engaging with the ratchet holds the valve disks in the positions to which they are moved. By turning the handle the pawl can be thrown into or out of engagement with the ratchet wheel when the valves are being operated. Each valve stem has an eye bolt 50 for the attachment of a counterbalance cable if desired to counterbalance the weight of large valves.

In the form of the invention previously described the valve disks are lifted and lowered by vertical movements impartd to the valve stems by racks and pinions. The valve disks, however, may be carried up and down by the rotation of threaded stems, as illustrated in Figs. 11 and 12. In this latter form the valve stem 51 at its lower end is journaled in a set lining 52 in a socket 53 on the bottom of the valve box casing that holds the lower end of the guide bar 54. At its upper end the valve stem is journaled in a box 55 set into the valve box cover. On the threaded section of the valve stem is a nut 56 that is loosely connected with a saddle 57 which is secured to the back of the valve disk 58 so that the valve disk is carried up and down by the rotation of the stem and travel of the nut thereon. The nut has an incline 59 on its back face that is adapted to engage with an incline 60 on the front edge of the guide bar for seating the valve disk tightly. A thrust screw 61 may be turned into the front face of the valve disk against the face of the nut for adjusting the parts so that the valve disk will seat closely and this thrust screw may be locked in place by means of an expansion plug 62 turned into the front end of the thrust screw. The upward and downward thrusts of the valve stem are met by an inner collar 63 and an outer collar 64 which are desirably so spaced apart as to leave a clearance either above or below the box 55. The presence or absence above the box of this space indicates whether the valve is closed or open. There is a stop pin 65 in the guide bar that is engaged by the saddle when the valve disk is fully open and a stop pin 66 in the guide bar that is engaged by the saddle when the valve is fully closed. When the valve disk is lowered and the nut descends the saddle rests upon the pin 66, and then the further turning of the stem moves the nut downwardly until it has wedged the valve disk against its seat tightly. With this form the valve stem may be provided with a beveled gear 67 that is engaged by a beveled gear 68 on a handled shaft 69 that is held in bearings mounted on any suitable overhead support.

In each strainer chamber there is a removable strainer element which may comprise a substantially cylindrical vertically arranged outer basket 70 with a substantially cylindrical vertically arranged but smaller basket 71 removably supported therein. These baskets may be made of wire mesh or perforated metal as desired. The outer basket has an internal flange 72 at its top, while the inner basket has an external flange 73 at its top that is adapted to rest upon the flange of the outer basket. These baskets are illustrated as located eccentrically with relation to each other and to the strainer chamber in which they are placed. The delivery opening 74 from the space between the baskets is connected with the port through the hub containing the valve seat. In the bottom of the outer basket is a spider 75 with a hub 76 and in the top of the inner basket is a spider 77 with a hub 78. Extending through these hubs is a tubular post 79 that rests on the bottom of the chamber and at the top is retained by a socket 80 on the inside of the cover. The bolt 81 that fastens the cover in position passes through the cover, the tubular post and the bottom of the strainer cylinder, and on this bolt is an eccentric collar 82 that engages the inner wall of the tubular post for holding the baskets with the delivery opening close to the port through the hub.

When this apparatus is in normal operation all of the valves are open and the liquid to be treated enters through the intake opening into the inlet valve box and divides and flows through the two inlet branch passages to the strainer chambers where it passes through the strainers, leaving the matter to be separated. The cleaned liquid then flows through the two discharge hubs into the discharge valve box where the streams unite into one and leave by the discharge opening. When it becomes necessary to clean or repair the strainers the two valves controlling the branch passages to that chamber are closed and the cover of that chamber may be removed and the cleaning or recharging completed, after which the chamber is closed and the valves again opened.

The invention claimed is:—

1. In a liquid straining apparatus, a box containing a valve chamber having an intake opening and an outlet opening and containing a sliding valve arranged to move over and close said outlet opening, a removable stationary guide bar slidingly supporting said valve and having an inclined surface acting with a corresponding inclined surface carried by said valve to clamp the valve against its seat when opposite said outlet opening, and means for sliding said valve.

2. In a liquid straining apparatus, a box containing a valve chamber and having an intake and an outlet opening, a sliding valve controlling the outlet opening, means for sliding said valve, and a stationary guide bar slidingly supporting said valve throughout its movement, said bar being supported at its ends by the end walls of said chamber.

3. In a liquid straining apparatus, a casing inclosing a valve chamber, an outlet opening from said chamber surrounded by a valve seat, a slide valve disk operating on said seat, a stationary thrust member with an inclined surface acting to force said disk onto said seat when in the closed position, and set-lining means for securing said thrust member in position in said valve chamber.

4. In a liquid straining apparatus, a box containing a valve chamber, with an intake and an outlet opening, a sliding valve controlling said outlet opening, means for sliding said valve and a stationary bar for guiding said valve, said guide bar being supported in a set-lining molded into a socket with roughened walls in the said valve chamber.

5. In a liquid straining apparatus, a valve chamber, a removable cover for said chamber, a sliding valve disk and a guide bar for the same in said chamber, a stem for sliding said valve disk, a stand mounted on said cover supporting said stem and means for supporting said guide bar from said cover.

6. A strainer valve comprising a sliding valve disk adjustably supporting a wedge member having an inclined surface coöperating with an inclined surface of a stationary member, means carried by the valve disk accessible from the face of said valve disk adapted to adjust and maintain the thrust distance between said valve disk and said wedge member.

7. A strainer valve comprising a sliding valve disk carrying a wedge member having an inclined surface coöperating with an inclined surface of a stationary member to force said valve disk onto its seat when in the closed position and a thrust screw turned into the said valve disk against said wedge member to adjust the distance from the face of said valve disk to the inclined surface of said wedge member.

8. A strainer valve comprising a sliding valve disk adjustably supporting a wedge member having an inclined surface coöperating with an inclined surface of a stationary member, and a thrust screw turned through said valve disk against said wedge member and provided with tool receiving means for adjusting it from the face of the valve.

9. A strainer valve comprising a sliding valve disk carrying a wedge member having an inclined surface coöperating with an inclined surface of a stationary member, a thrust screw turned through said valve disk against said wedge member and furnished with tool receiving means for adjusting it from the face of the valve and a tapered expansion clamping plug screwed into the end of said thrust screw and also furnished with tool receiving means for setting it from the face of the valve disk.

10. In a liquid straining apparatus, a straining chamber, a valve chamber, a passage between said chambers, a sliding valve disk arranged to slide over and close the mouth of said passage in said valve chamber, a valve stem and means carried by and extending through the valve disk, said means being accessible through said passage for coupling together and uncoupling said valve from said stem when said valve is in the closed position.

11. A strainer valve comprising a sliding valve disk, a valve stem, a tapered pin passing through said valve disk from its face into said stem to couple them together, means accessible from the face of said disk for removably securing said pin in place and means also accessible from the face of said disk for withdrawing said pin and thereby releasing said disk from said stem.

12. A strainer valve comprising a sliding valve disk having a forward projection or hub, a valve stem, a coupling pin passing through the said valve disk and projection into said stem, a cross cotter pin passing transversely through the said projection and the said coupling pin and having its ends lying in recesses in opposite sides of said projection for removably securing said coupling pin in place.

13. In a liquid straining apparatus, a box normally closed by a removable cover and containing a valve chamber having an intake opening and an outlet opening, a slide valve controlling said outlet opening, means for moving said valve, and a stationary guide bar back of and slidingly supporting said valve in all its positions, said guide bar having its two ends removably supported by sockets in the bottom and cover respectively of said box.

14. A strainer valve operating mechanism comprising two shafts, a driving head secured to one of said shafts, a driven head secured to the other of said shafts, an adjusting disk clamped to the face of said driven head by a clamp bolt through a circumferentially elongated hole, and a longitudinal driving pin carried by said driving head and engaging a circumferentially elongated hole in said disk whereby one shaft may be set to drive the other at any desired angle thereto in one direction but at a different angle in the reverse direction.

15. A strainer valve operating mechanism comprising two shafts, a driving head secured to one of said shafts, a driven head secured to the other of said shafts, an adjusting disk clamped to the face of said driven head by a clamp bolt through a circumferentially elongated hole, and a longitudinal driving pin carried by said driving head and engaging a hole in said disk to couple said shafts together at any desired angle to each other.

16. In a liquid straining apparatus, two valves, adjustable coupling means for closing and seating both valves simultaneously by the continuous movement of a driving means and of unseating one of said valves ahead of the other by the reverse movement of the said driving means.

17. In a liquid straining apparatus, two valve disks, each with a driving means, an adjustable coupling connecting said driving means adjustable to move said valve disks in one direction at any relative position of one valve disk to the other but to start one valve disk ahead of the other in the opposite direction of movement.

18. In a liquid straining apparatus, two valve disks, two seats for same, two separable means, one each, for moving said valve disks against and from their respective seats, a common differential coupling, and driving means for applying equal pressure on both valve disks to seat them equally by a single continuous movement of said common driving means.

19. In a liquid straining apparatus, two valve disks, each with a driving means, an adjustable coupling connecting said driving means, said coupling being adapted to connect said driving means at any relative positions of said valve disks to each other.

PHILIP J. DARLINGTON.